United States Patent [19]

Yokomori et al.

[11] Patent Number: 5,235,589
[45] Date of Patent: Aug. 10, 1993

[54] APPARATUS FOR RECORDING AND REPRODUCING OPTICAL INFORMATION AND PRISM COUPLER

[75] Inventors: Kiyoshi Yokomori; Tami Isobe, both of Yokohama; Shigeyoshi Misawa, Tokyo; Syunsuke Fujita; Magane Aoki, both of Yokohama, all of Japan

[73] Assignee: Ricoh Company, Ltd., Tokyo, Japan

[21] Appl. No.: 703,294

[22] Filed: May 20, 1991

[30] Foreign Application Priority Data

| May 21, 1990 | [JP] | Japan | 2-131091 |
| Jan. 18, 1991 | [JP] | Japan | 3-018513 |
| Jan. 21, 1991 | [JP] | Japan | 3-020588 |
| Apr. 5, 1991 | [JP] | Japan | 3-071964 |

[51] Int. Cl.$^5$ .............................. G11B 7/00; G02B 6/34
[52] U.S. Cl. ............................... 369/112; 385/36; 385/129
[58] Field of Search ............. 385/33, 34, 36, 37, 385/5; 369/44.12, 44.23, 112

[56] References Cited

U.S. PATENT DOCUMENTS

| 4,545,642 | 10/1985 | Auracher et al. | 385/36 |
| 4,565,422 | 1/1986 | Seymour et al. | 385/36 |
| 4,637,684 | 1/1987 | Tomita et al. | 385/36 |
| 4,653,844 | 3/1987 | Ward | 385/36 |
| 4,877,301 | 10/1989 | Yokomori et al. | 385/37 |
| 4,932,743 | 6/1990 | Isobe et al. | 385/36 |
| 5,119,452 | 6/1992 | Yokomori et al. | 385/36 |

OTHER PUBLICATIONS

U.S. Ser. No. 07/683,724, filed on Apr. 11, 1991.

*Primary Examiner*—Aristotelis Psitos
*Assistant Examiner*—P. W. Huber
*Attorney, Agent, or Firm*—Cooper & Dunham

[57] ABSTRACT

An apparatus for recording and reproducing optical information includes an optical integration detecting element arranged on an optical path of light from a laser beam source to an optical information recording medium. The optical integration detecting element has an optical waveguide layer formed on a substrate; a photodetector connected to the optical waveguide layer; a first gap layer formed on the optical waveguide layer and having a refractive index lower than that of the optical waveguide layer; a second gap layer formed on the first gap layer and having an opening portion and a refractive index lower than that of the optical waveguide layer; an adhesive layer having a refractive index higher than that of the optical waveguide layer and adhered to the first gap layer such that the opening portion of the second gap layer is filled with the adhesive layer; and a prism adhesively fixed to an upper portion of the adhesive layer and constructed by a dielectric substance having a refractive index higher than that of the optical waveguide layer.

1 Claim, 6 Drawing Sheets

APPARATUS FOR RECORDING AND REPRODUCING OPTICAL INFORMATION AND PRISM COUPLER

BACKGROUND OF THE INVENTION

1. Field of the Invention

The present invention relates to an apparatus for recording and reproducing optical information and a prism coupler used as an optical integrating means in an optical disk memory, etc.

2. Description of the Related Art

In a general apparatus for recording and reproducing optical information and having a means for detecting light by an optical waveguide, light is converged onto an optical disk through a focusing grating coupler and light reflected from the optical disk is again guided to an optical waveguide layer through the focusing grating coupler. Accordingly, light utilization efficiency provided by using an optical pickup is influenced by diffraction efficiency (optical coupling efficiency) of the focusing grating coupler.

In general, incident and light-emitting coupling efficiencies of the focusing grating coupler are respectively set to 20% and 50% so that the focusing grating coupler has low incident and light-emitting coupling efficiencies. When coupling efficiency of waveguide light from a semiconductor laser to the optical waveguide layer is set to a/100 (%) in consideration of the light utilization efficiency, the transmittance of a waveguide beam splitter is equal to 50%. Accordingly, a quantity of light reaching the optical disk and a quantity of light reaching a signal detecting optical system are respectively set to small values such as 10% and 0,625% even when the above value a is set to one. Accordingly, in the optical pickup used for an optical disk memory, it is necessary to increase the quantities of light reaching the optical disk and the signal detecting optical system as much as possible. However, no structure for increasing these light quantities as much as possible is sufficiently considered in the above general optical information recording/reproducing apparatus.

In a prism coupler as a second general example, a laser beam is incident to a tapered region of a gap layer having a tapered portion having about 1 mm in length. Accordingly, it is necessary that the laser beam having a very small beam radius such as 0.158 mm is incident to this tapered region. Therefore, in such a structure of the prism coupler, only the laser beam having a small beam radius equal to or less than several millimeters divided by ten can be coupled to an optical waveguide layer. Further, it is necessary to make such a very small laser beam incident to the tapered portion of the gap layer. Therefore, an accuracy of about ±10 μm is required in an incident position of the laser beam so that it is very difficult to adjust this incident position. Further, optical coupling efficiency is greatly changed by inclination of the tapered portion so that it is necessary to strictly control the inclination of the tapered portion, which is troublesome in operation of the prism coupler.

SUMMARY OF THE INVENTION

It is therefore a first object of the present invention to provide an apparatus for recording and reproducing optical information and having a high light utilization efficiency.

A second object of the present invention is to provide an apparatus for recording and reproducing optical information in which a quantity of light detected by a photodetector can be increased.

A third object of the present invention is to provide an apparatus for recording and reproducing optical information in which the position of an incident light beam is easily adjusted.

A fourth object of the present invention is to provide an apparatus for recording and reproducing optical information in which yield at a manufacturing time of a prism can be improved.

A fifth object of the present invention is to provide a compact apparatus for recording and reproducing optical information A sixth object of the present invention is to provide a prism coupler in which an optical coupling operation can be performed without any influence of the inclination of a tapered portion as in the general prism coupler, and the optical coupling operation can be efficiently performed with respect to a large light beam having a radius equal to or greater than several millimeters divided by ten.

A seventh object of the present invention is to provide a prism coupler in which the position of an incident light beam is easily adjusted.

An eighth object of the present invention is to provide a prism coupler in which yield at a manufacturing time of a prism can be improved.

In accordance with a first structure of the present invention, the first object can be achieved by an apparatus for recording and reproducing optical information in which light emitted from a laser beam source is changed to a parallel light beam by a collimator lens and is converged by an objective lens onto a surface of an optical information recording medium to record the optical information onto the optical information recording medium; the optical information recording/reproducing apparatus including an optical integration detecting element arranged on an optical path of the emitted light from the laser beam source to the optical information recording medium, the optical integration detecting element comprising a substrate; an optical waveguide layer formed on the substrate; photodetectors in the optical waveguide layer; a first gap layer formed on the optical waveguide layer and having a refractive index lower than that of the optical waveguide layer; a second gap layer formed on the first gap layer and having an opening portion and a refractive index lower than that of the optical waveguide layer; an adhesive layer having a refractive index higher than that of the optical waveguide layer and adhered to the first gap layer such that the opening portion of the second gap layer is filled with the adhesive layer; and a prism adhesively fixed to an upper portion of the adhesive layer and constructed by a dielectric substance having a refractive index higher than that of the optical waveguide layer.

In accordance with a second structure of the present invention, the second object can be achieved by the optical information recording/reproducing apparatus having the first structure in which an end face portion of the second gap layer located in the opening portion thereof is formed in a tapered shape.

In accordance with a third structure of the present invention, the third object can be achieved by the optical information recording/reproducing apparatus having the second structure in which the tapered end face portion of the second gap layer is formed by forming the second gap layer as a film in a state in which a shadow mask is arranged in the second gap layer.

In accordance with a fourth structure of the present invention, the fourth object can be achieved by the optical information recording/reproducing apparatus having the first, second or third structure in which the adhesive layer is formed by a visible light cured adhesive or UV light cured adhesive.

In accordance with a fifth structure of the present invention, the first object can be also achieved by an apparatus for recording and reproducing optical information, comprising a laser beam source; a coupling lens for changing light emitted from the laser beam source to a parallel light beam; and an optical integration detecting element arranged on an optical path of the parallel light beam provided by the coupling lens; the optical integration detecting element including an optical waveguide layer formed on a surface of a substrate; photodetectors in the optical waveguide layer; a gap adjusting layer formed on a surface of the optical waveguide layer and having a refractive index lower than that of the optical waveguide layer; an adhesive layer formed on a surface of the gap adjusting layer and having a refractive index higher than that of the optical waveguide layer; a metallic layer disposed in a portion of the adhesive layer; and a prism formed on a surface of the adhesive layer and having a refractive index higher than that of the optical waveguide layer; the optical information recording/reproducing apparatus further comprising an objective lens arranged on an optical path on which the parallel light beam provided by the coupling lens with respect to the emitted light from the laser beam source is incident to the prism of the optical integration detecting element and is coupled in and coupled out by the optical waveguide layer and is again emitted from the prism; and an optical information recording medium arranged on an optical path of light converged by the objective lens; the optical information recording/reproducing apparatus being set such that light reflected from the optical information recording medium is incident to the prism of the optical integration detecting element and is coupled and propagated in the optical waveguide layer toward the photodetector.

In accordance with a sixth structure of the present invention, the fifth object can be achieved by the optical information recording/reproducing apparatus having the fifth structure in which a light-emitting optical system is constructed by the laser beam source and the coupling lens and is arranged such that a transmitting direction of light from the light-emitting optical system to the prism of the optical integration detecting element is parallel to the substrate surface of the optical integration detecting element, and the light-emitting optical system is set such that the light incident to the prism from the light-emitting optical system is coupled in and coupled out by the optical waveguide layer and is again reflected on one slanting face of the prism toward the optical information recording medium.

In accordance with a seventh structure of the present invention, the sixth object can be achieved by a prism coupler comprising a substrate; an optical waveguide layer formed on the substrate; a first gap layer formed on the optical waveguide layer and having a refractive index lower than that of the optical waveguide layer; a second gap layer formed on the first gap layer and having a refractive index lower than that of the optical waveguide layer; the second gap layer having a tapered portion on an end face thereof and an opening portion having a predetermined width; an adhesive layer having a refractive index higher than that of the optical waveguide layer and adhered to the first gap layer such that the opening portion of the second gap layer is filled with the adhesive layer; and a prism adhesively fixed to an upper portion of the adhesive layer and constructed by a dielectric substance having a refractive index higher than that of the optical waveguide layer.

In accordance with an eighth structure of the present invention, the seventh object can be achieved by the prism coupler having the seventh structure in which the prism coupler is set such that a light beam is incident to both the opening portion and the tapered portion of the second gap layer.

In accordance with a ninth structure of the present invention, the seventh object can be also achieved by the prism coupler having the seventh structure in which the tapered portion of the second gap layer is formed by forming the second gap layer as a film in a state in which a shadow mask is arranged in the second gap layer.

In accordance with a tenth structure of the present invention, the eighth object can be achieved by the prism coupler having the seventh structure in which the adhesive layer is formed by a visible light cured adhesive or UV light cured adhesive.

In the first structure of the present invention, decoupling provided by the prism of the optical integration detecting element is used on an optical path of the emitted light from the laser beam source to the optical information recording medium. The second gap layer is arranged on an optical path of the reflected light from the optical information recording medium and is located on a bottom face of the prism to prevent the decoupling. Accordingly, approximately 100% of light transmitted through a coupling lens reaches the optical information recording medium. Further, approximately 100% of the reflected light from the optical information recording medium reaches the prism. Accordingly, a large quantity of this light reaching the prism can be received by the photodetector formed in the optical integration detecting element. Accordingly, a high light utilization efficiency can be obtained in comparison with the general optical information recording/reproducing apparatus.

In the second structure of the present invention, it is possible to prevent scattering of light incident to the second gap layer since the end face portion of the second gap layer is formed in a tapered shape. Accordingly, the quantity of light detected by the photodetector can be further increased in comparison with the above first structure.

In the third structure of the present invention, it is possible to form the second gap layer having a taper ratio equal to or greater than 1 to 1000 so that a position of the light incident to the second gap layer is easily adjusted.

In the fourth structure of the present invention, after the opening portion of the second gap layer is filled with the adhesive, light or ultraviolet is irradiated onto the adhesive in a state in which the prism comes in press-contact with the adhesive. Thus, the adhesive is hardened and the prism can be easily fixed to the adhesive layer, thereby increasing yield at a manufacturing time of the prism.

In the fifth structure of the present invention, decoupling provided by the prism of the optical integration detecting element is used on an optical path of the emitted light from the laser beam source to the optical information recording medium. The metallic layer is arranged on an optical path of the reflected light from the optical information recording medium and is located on a bottom face of the prism to prevent the decoupling. Accordingly, approximately 100% of the light transmitted through the coupling lens reaches the optical information recording medium. Further, approximately 100% of the reflected light from the optical information recording medium reaches the prism. Accordingly, a large quantity of this light incident to the prism can be received by the photodetector formed in the optical integration detecting element. Accordingly, a high light utilization efficiency can be obtained in comparison with the general optical information recording/reproducing apparatus.

In the sixth structure of the present invention, the light-emitting optical system is arranged such that this light-emitting optical system is parallel to a substrate face of the optical integration detecting element. Accordingly, an optical pickup system can be arranged in proximity to the optical integration detecting element so that the optical information recording/reproducing apparatus can be made compact.

In the seventh structure of the present invention, optical coupling efficiency with respect to an optical waveguide is mainly optimized by a thickness of the first gap layer. Accordingly, an optical coupling operation can be performed without any influence of inclination of the tapered portion as in the general prism coupler. Further, the optical coupling operation can be efficiently performed by increasing a size of the opening portion with respect to a large light beam having a radius equal to or greater than several millimeters divided by ten. In the eighth structure of the present invention, it is sufficient to make a portion of the light beam incident to the tapered portion of the second gap layer so that a position of the incident light beam is easily adjusted in comparison with the general prism coupler.

In the ninth structure of the present invention, it is possible to form the second gap layer having a taper ratio equal to or greater than 1 to 1000 so that the position of the incident light beam is easily adjusted.

In the tenth structure of the present invention, after the opening portion of the second gap layer is filled with the adhesive, light or ultraviolet is irradiated onto the adhesive in a state in which the prism comes in press-contact with the adhesive. Thus, the adhesive is hardened and the prism can be easily fixed to the adhesive layer, thereby increasing yield at a manufacturing time of the prism.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an optical information recording/reproducing apparatus and a prism coupler in the present invention will next be described in detail with reference to the accompanying drawings.

Figure 1:
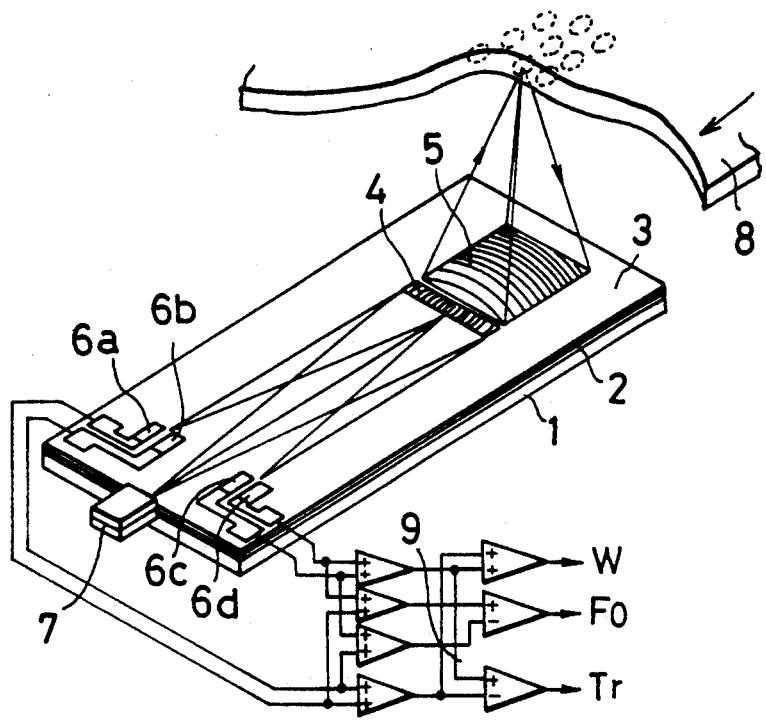
FIG. 1 is a perspective view showing a general apparatus for recording and reproducing optical information.

FIG. 1 shows an apparatus for recording and reproducing optical information and having a means for detecting light by an optical waveguide. This optical information recording/reproducing apparatus is shown as a first general example. in FIG. 1, an optical waveguide layer 3 is deposited on a silicon substrate 1 through a buffer layer 3. A waveguide beam splitter 4 and a focusing grating coupler 5 are formed on a surface of the optical waveguide layer 3. Two photodetectors 6a, 6b and two photodetectors 6c, 6d are respectively located at opposite ends of the silicon substrate 1 on left-handed and right-handed sides thereof. These photodetectors 6a to 6d are connected to the optical waveguide layer 3. A semiconductor laser 7 as a laser beam source is disposed at one end of the silicon substrate 1.

In such an optical information recording/reproducing apparatus, light emitted from the semiconductor laser 7 is coupled onto an end face of the silicon substrate 1 and is guided to the waveguide beam splitter 4 by the optical waveguide layer 3. The guided light is transmitted through the waveguide beam splitter 4 and is then diffracted by the focusing grating coupler 5. The diffracted light is transmitted in the air and is then irradiated onto a surface of an optical disk 8 as an optical information recording medium, thereby recording optical information onto the optical disk, etc. Light reflected from the optical disk 8 is again incident to the focusing grating coupler 5 and is changed to waveguide light by this focusing grating coupler 5. This waveguide light is diffracted by the waveguide beam splitter 4 so that the waveguide light is divided into two light beams. Thereafter, these two light beams are deflected by the left-handed two photodetectors 6a, 6b and the right-handed two photodetectors 6a, 6d.

Voltage values of optical signals detected by these four photodetectors 6a to 6d are set to a to d in the following description. In the case, the voltage values of a reproducing signal W, a focusing error signal Fo and a tracking error signal Tr detected by these photodetectors 6a to 6d can be calculated by the following calculating formulas.

$$W32\ a+b+c+d$$

$$Fo=(a+d)-(b+c)$$

$$Tr=(c+d)-(a+b)$$

The focusing error signal Fo can be detected by a Foucault method and the tracking error signal Tr can be detected by a push-pull method.

Figure 2:
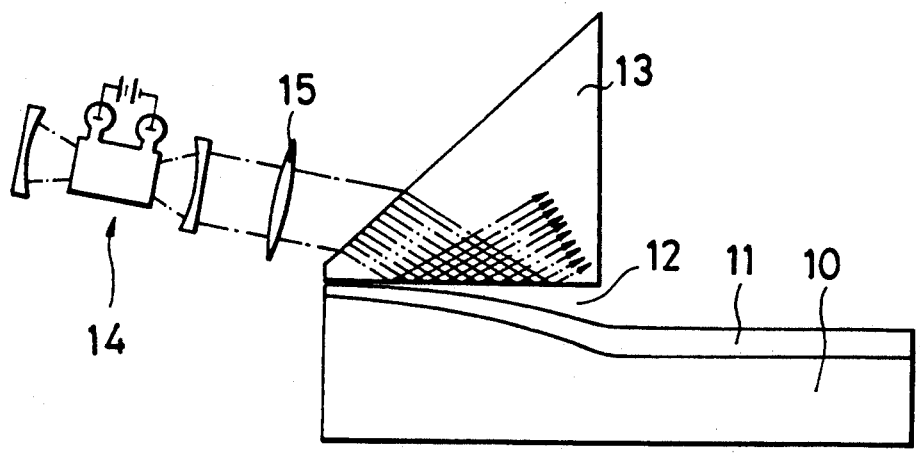
FIG. 2 is a side view showing a general prism coupler.

FIG. 2 layer shows a prism coupler as a second general example. In FIG. 2, an optical waveguide layer 11 is formed on a surface of a substrate 10 partially having a tapered shape. A prism 13 is formed on a surface of the optical waveguide layer 11 through a gap layer 12 having a tapered shape. light is emitted from a laser beam source section 14 disposed in the exterior of the prism coupler and is incident to the prism 13 through a lens 15. A portion of the light incident to the prism 13 is coupled to the optical waveguide layer 11 through the gap layer 12 having a tapered shape. Optical coupling efficiency of 88% can be obtained by using the prism coupler having the above structure. Designing conditions of the above prism are set as follows.

The optical waveguide layer 11 is constructed by a polymer film having refractive index n=1.60 and 0.886 μm in thickness.

The gap layer 12 is made of glass having refractive index n=1.46.

The prism 13 is made of film glass having refractive index n=1.63.

A beam radius is set to 0.158 mm.

In the optical information recording/reproducing apparatus as the first general example, light is converged onto the optical disk 8 through the focusing grating coupler 5 and the reflected light from the optical disk 8 is again guided to the optical waveguide layer 3 through the focusing grating coupler 5. Accordingly, light utilization efficiency provided by using an optical pickup is influenced by diffraction efficiency (optical coupling efficiency) of the focusing grating coupler 5.

In general, incident and light-emitting coupling efficiency of the focusing grating coupler 5 are respectively set to 20% and 50% so that the focusing grating coupler 5 has low incident and light-emitting coupling efficiencies. When coupling efficiency of waveguide light from the semiconductor laser 7 to the optical waveguide layer 3 is set to a/100% in consideration of the light utilization efficiency, transmittance of the waveguide beam splitter 4 is equal to 50%. Accordingly, a quantity Pw of light reaching the optical disk 8 and a quantity Po of light reaching a signal detecting optical system 9 are respectively provided as follows.

$$
\begin{aligned}
Pw &= a \times 0.5 \times 0.2 \\
&= 0.1 \times a \times 100\ (\%) \\
Po &= Pw \times 0.5 \times R \\
&= 0.025 \times a \times R \times 100\ (\%)
\end{aligned}
$$

In this case, the quantities Pw and Po of light are respectively set to small values of 10% and 0.625% even when the above value a is set to 1. Accordingly, in the optical pickup used for an optical disk memory, it is necessary to increase the quantities of light reaching the optical disk 8 and the signal detecting optical system 9 as much as possible. However, no structure for increasing these light quantities as much as possible is sufficiently considered in the above general optical information recording/reproducing apparatus.

In the above prism coupler as the second general example, a laser beam is incident to a tapered region of the gap layer 12 having a tapered portion having about 1 mm in length. Accordingly, it is necessary that the laser beam having a very small beam radius such as 0.158 mm is incident to this tapered region. Therefore, in the above structure of the prism coupler, only the laser beam having a small beam radius equal to or less than several millimeters divided by ten can be coupled to the optical waveguide layer 11. Further, it is necessary to make such a very small laser beam incident to the tapered portion of the gap layer 12. Therefore, an accuracy of about ±10 μm is required in an incident position of the laser beam so that it is very difficult to adjust this incident position. Further, the optical coupling efficiency is greatly changed by inclination of the tapered portion so that it is necessary to strictly control the inclination of the tapered portion, which is troublesome in operation of the prism coupler.

Figure 3:
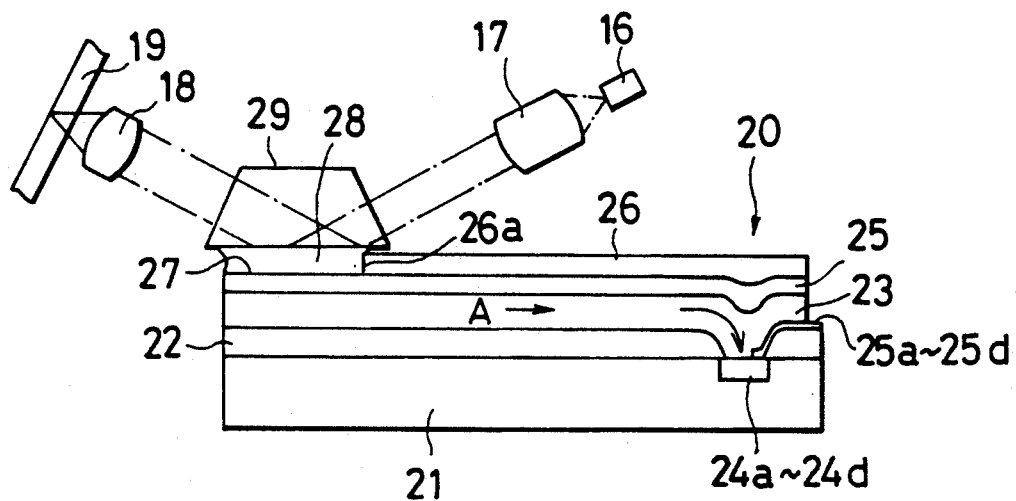
FIG. 3 is a side view showing first and fourth structures of the present invention in an apparatus for recording and reproducing optical information in accordance with a first embodiment of the present invention.
Figure 4:
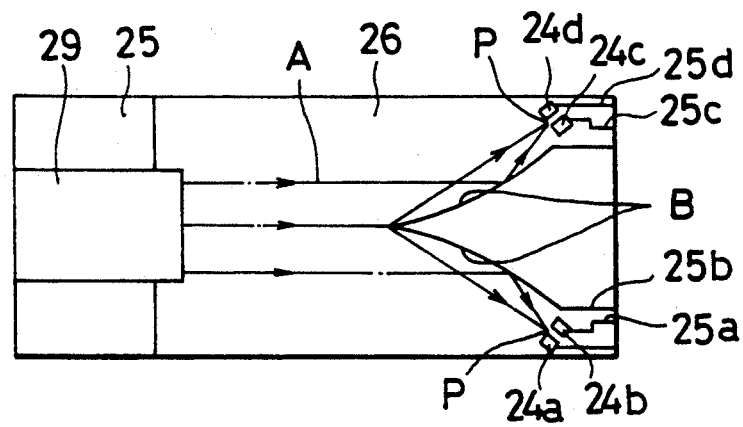
FIG. 4 is a plan view showing the optical information recording/reproducing apparatus having the first and fourth structures.

FIGS. 3 and 4 show first and fourth structures of the present invention in an apparatus for recording and reproducing optical information in accordance with a first embodiment of the present invention. As shown in FIG. 3, light is emitted from a semiconductor laser 16 as a laser beam source and is changed to a parallel light beam by a collimator lens 17. This parallel light beam is converged by an objective lens 18 and is irradiated onto a surface of an optical disk 19 as an optical information recording medium, thereby recording optical information onto the optical disk, etc. An optical integration detecting element 20 is arranged on an optical path of the emitted light from the semiconductor laser 16 to the optical disk 19. An optical waveguide layer 23 is formed on a substrate 21 through a buffer layer 22 in the optical integrated detecting element 20. The optical waveguide layer 23 is connected to photodetectors 24a, 24b, 24c, and 24d, buried in the substrate 21. A first gap layer 25 is laminated on the optical waveguide layer 23 and has a refractive index lower than that of the optical waveguide layer 23. A second gap layer 26 is laminated on the first gap layer 25 and has a refractive index lower than that of the optical waveguide layer 23. An opening portion 27 is formed in an end face portion 26a of the second gap layer 26. The opening portion 27 of the second gap layer 26 is filled an adhesive layer 28 having a refractive index higher than that of the optical waveguide layer 23. Thus, the adhesive layer 28 is adhered to the first gap layer 25. A prism 29 is adhesively fixed onto an upper portion of the adhesive layer 28 and is constructed by a dielectric substance having a refractive index higher than that of the optical waveguide layer 23.

In such an optical information recording/reproducing apparatus, light emitted from the semiconductor 16 is changed to a parallel light beam by the collimator lens 17 and is incident to the prism 29 of the optical integrated detecting element 20. Thereafter, a portion of this incident light is reflected on a bottom face of the prism 29 and the other portions of this incident light propagates leftward in FIG. 3. This guided light is again radiated by the prism 29 therefrom. Such radiation is called decoupling. The light reflected on the bottom face of the prism 29 and the light radiated by the decoupling are again emitted together from the prism 29 and are converged by the objective lens 18. The converged light is then irradiated on a face of the optical disk 19, thereby recording optical information onto the optical disk, etc. Light reflected from the optical disk 19 again incident to the prism 29 through the objective lens 18. A portion of this incident light is reflected on the bottom face of the prism 29 and the other portions of this incident light propagate as guided light A in the optical waveguide layer 23 through the adhesive layer 28 and the first gap layer 25. This guided light A is not decoupled with respect to the prism 29 again, but propagates in the optical waveguide layer 23 since the second gap layer 26 exists. In this case, the optical information recording/reproducing apparatus is constructed such that a predetermined quantity of light is coupled into the optical waveguide layer 23 by controlling a thickness of the first gap layer 25. When the second gap layer 26 has a thin thickness, a portion of the guided light A is radiated toward the prism 29. Accordingly, it is necessary to set the second gap layer 26 to be sufficiently thick such that no guided light A is radiated toward the prism 29. In this embodiment, it is sufficient to set the thickness of the second gap layer 26 to a value equal to or greater than 1 μm.

As shown in FIG. 4, the waveguide light A is divided into two light beams on convergent mirror faces B of the optical waveguide layer 23 and is then reflected on the convergent mirror faces B. One of the two divided and reflected light beams is focused between the photodetectors 24a and 24b. The other light beam is focused between the photodetectors 24c and 24d. In this case, when operating state between the optical disk 19 and the objective lens 18 is just focusing state, convergent points P of the lights reflected and converged on the convergent mirror faces B are respectively located between the photodetectors 24a and 24b and between the photodetectors 24c and 24d. In contrast to this, when the operating state between the optical disk 19 and the objective lens 18 is state shifted from the focusing state and the optical disk 19 and the objective lens 18 are far from each other, the convergent points P are respectively shifted and moved toward the photodetector 24a and 24d. When the operating state between the optical disk 19 and the objective lens 18 is state shifted from the focusing state and the optical disk 19 and the objective lens 18 approach each other, the convergent points P are respectively shifted and moved toward the photodetectors 24b and 24c. Accordingly, a focusing error signal can be detected by such a structure. Further, a tracking error signal and a reproducing signal can be detected by using optical signals detected by these four photodetector 24a to 24d.

A concrete constructional example of the optical integrated detecting element 20 will next be described.

In the following description, with respect to the respective constructional layers of the optical integrated detecting element 20, reference numerals $n_p$ and $n_c$ respectively designate refractive indexes of the prism 29 and the adhesive layer 28. Reference numerals $n_g$ and $n_m$ respectively designate refractive indexes of the first gap layer 25 and the second gap layer 26. Further, reference numerals $n_w$ and $n_b$ respectively designate refractive indexes of the optical waveguide layer 23 and the buffer layer 22. In this case, these constructional elements are formed such that the following relation is satisfied.

$$n_p, n_c > n_w > n_g, n_m, n_b$$

A concrete numerical example of these refractive indexes, etc. will next be described.

A wavelength of the laser beam is 790 nm.

The prism is made of optical glass with high refractive index $n_p = 1.7656$.

The adhesive layer is constructed by an UV light cured adhesive with high refractive index $n_c = 1.63$.

The first gap layer is a sputtered SiO$_2$ film and the refractive index and thickness of this first gap layer are as follows.

$n_g = 1.467$, d = 0.52 μm

The second gap layer is a sputtered SiO$_2$ film and the refractive index and thickness of this second gap layer are as follows.

$n_m = 1.467$, d = 1.5 μm

The optical waveguide layer is a SiON film deposited by using plasma enhanced CVD and the refractive index and thickness of this optical waveguide layer are as follows.

$n_w = 1.557$, d = 1.5 μm

The buffer layer is a SiO$_2$ film which is thermally grown on a Si substrate and the refractive index and thickness of this buffer layer are as follows.

$n_b = 1.460$, D = 1.0 μm

The optical integrated detecting element 20 is constructed by the above constructional elements. The optical integrated detecting element is arranged such that an incident angle of light incident onto the bottom face of the prism 29 is set to 61° to couple this light into the optical waveguide layer 23 in a coupling region including the prism 29. In this case, this light is coupled into the optical waveguide layer 23 in a TEo mode. When a beam diameter of the parallel light provided by the collimator lens 17 is set to 4 mm, approximately 100% of this parallel light reaches a surface of the optical disk 19 and about 70% of the reflected light from the optical disk 19 can be coupled into the optical integration detecting element 20. This guided light can be received by the photodetectors 24a to 24d. photocurrents from the photodetectors 24a to 24d flow through electrodes 25a to 25d out of the optical integration detecting element 20.

Figure 5:
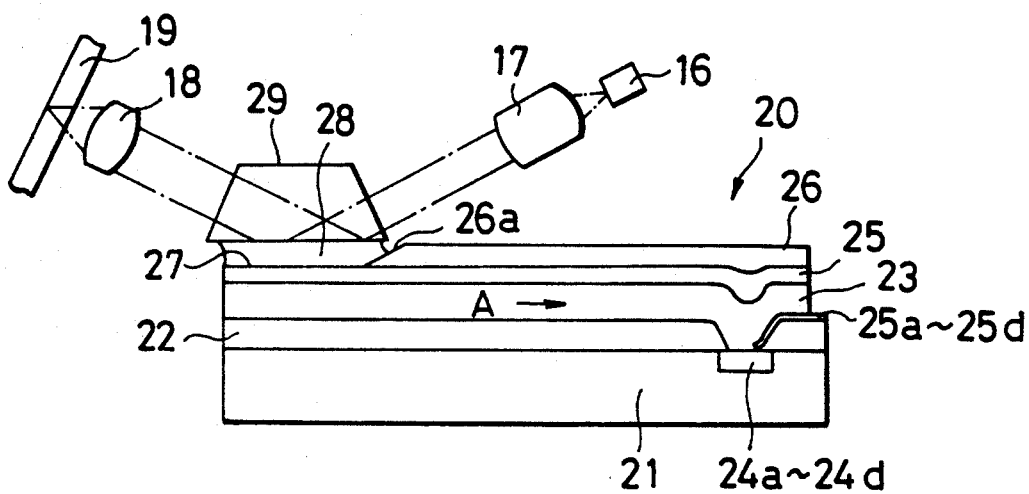
FIG. 5 is a side view showing second and third structures and the fourth structure of the present invention based on the optical information recording/reproducing apparatus in the first embodiment of the present invention.

FIG. 5 shows second and third structures and the fourth structure of the present invention based on the optical information recording/reproducing apparatus in the first embodiment of the present invention. In FIG. 5, the basic construction of an optical integration detecting element 20 is similar to that in the above first embodiment shown in FIG. 3. The shape of an end face portion 26a of a second gap layer 26 shown in FIG. 5 is different from that shown in FIG. 3. Namely, the end face portion 26a of the second gap layer 26 is located on the side of an opening portion 27 thereof and has a tapered shape. When light reflected from an optical disk 19 is incident to a prism 29, a portion of this incident light is incident to a tapered portion of the second gap layer 26. In the above first embodiment shown in FIG. 3, the end face portion 26a is constructed by an approximately vertical portion so that there is a possibility that a portion of light incident to the optical waveguide layer 23 is radiated by scattering. However, in this modified embodiment shown in FIG. 5, it is possible to prevent this scattering by forming the end face portion 26a in a tapered shape, thereby improving light utilization efficiency. The end face portion 26a having such a tapered shape is manufactured as follows. Namely, when the second gap layer 26 is laminated on a first gap layer 25, the second gap layer 26 is formed as a film in a state in which an unilluminated shadow mask is arranged in a portion of the second gap layer 26 corresponding to a position of the prism 29. Thus, it is possible to form a tapered portion of the end face portion 26a having a taper ratio equal to or greater than 1:1000.

In the above two embodiments shown in FIGS. 3 and 5, the second gap layer 26 is formed on an entire face of the substrate except for a position of the second gap layer 26 in proximity to the prism 23. However, the second gap layer 26 may be formed in the shape of a stripe in a position thereof corresponding to an end portion of the prism 29. In this case, it is possible to form tapered portions at both ends of the second gap layer 26.

Figure 6:
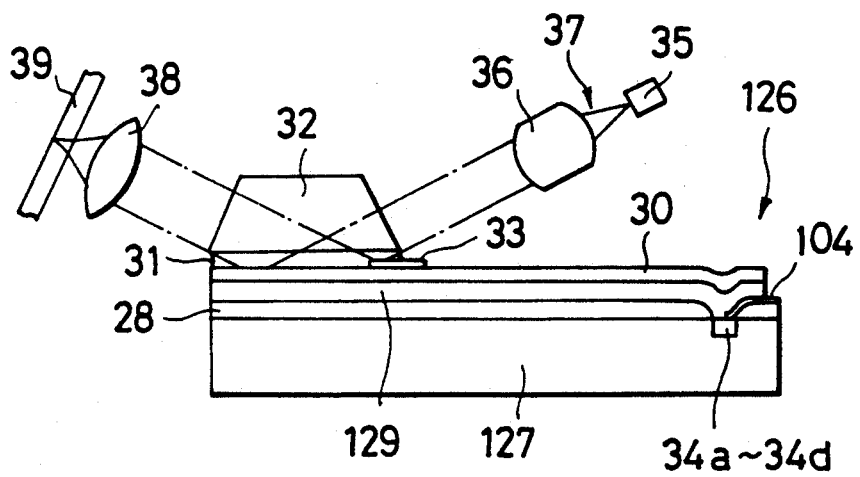
FIG. 6 is a side view showing a fifth structure of the present invention in an apparatus for recording and reproducing optical information in a second embodiment of the present invention.
Figure 7:
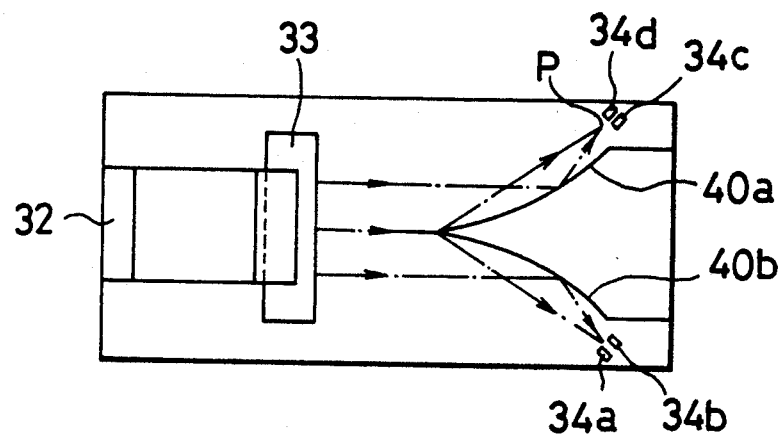
FIG. 7 is a plan view showing an optical integration detecting element disposed in the fifth structure of the present invention.

FIGS. 6 and 7 show a fifth structure of the present invention in an apparatus for recording and reproducing optical information in accordance with a second embodiment of the present invention. FIG. 6 shows an entire construction of the optical information recording/reproducing apparatus. With respect to an optical integrated detecting element 126, an optical waveguide layer 129 is formed on a silicon substrate 127 through a buffer layer 128. A gap adjusting layer 30 is laminated on a surface of the optical waveguide layer 129 and has a refractive index lower than that of this optical waveguide layer 129. An adhesive layer 31 is laminated on a surface of the gap adjusting layer 30 and has a refractive index higher than that of the optical waveguide layer 129. A prism 32 is adhesively fixed to the gap adjusting layer 30 by the adhesive layer 31. A metallic layer 33 is formed on the same plane as the adhesive layer 31 located below the prism 32. Photodetectors 34a to 34d are disposed in upper portions of the silicon substrate 127 and are connected to the optical waveguide layer 129.

A light-emitting optical system 37 is disposed in an upper portion of the optical integration detecting element 126. This light-emitting optical system 37 is composed of a optical system 37 is composed of a semiconductor laser 35 as a laser beam source and a collimator lens 36 for changing light emitted from this semiconductor laser 35 to a parallel light beam. An objective lens 38 and an optical disk 39 as an optical information recording medium are located in positions opposite to the light-emitting optical system 37 with respect to the prism 32. The photodetectors 34a to 34d are connected to an electrode 104 for transmitting electric signals to the exterior of the optical integrated detecting element 126.

In such an optical information recording/reproducing apparatus, light emitted from the semiconductor laser 35 is changed to a parallel light beam by the collimator lens 36. This parallel light beam is incident onto one face of the prism 32 from the collimator lens 36. This incident light is reflected on a bottom face of the prism 32 and is emitted from another face of the prism 32 to the objective lens 38. This emitted light is then changed to convergent light by the objective lens 38 and is formed as a light spot on a surface of the optical disk 39, thereby recording optical information onto the optical disk, etc. Light reflected from the optical disk 39 is again incident to the prism 32 through the objective lens 38. This incident light is coupled in the optical waveguide layer 129 located below the prism 32 and is detected by the photodetectors 34a to 34d.

As mentioned above, the light incident to the prism 32 is reflected on the bottom face thereof on an optical path of the emitted light from the semiconductor laser 35 to the optical disk 39. This reflected light is coupled in the optical wave-guide layer and then is radiated from the optical wave-guide layer 129 toward the prism 32. Such radiation is called a decoupling phenomenon. The light incident to the prism 32 is guided from the bottom face thereof to the optical waveguide layer 129 on an optical path of the reflected light from the optical disk 39 to the photodetectors 34a to 34d. As this time, since the metallic layer 33 exists, the light once incident to the optical waveguide layer 129 is transmitted therethrough as it is so that no decoupling phenomenon mentioned above is caused. Accordingly, it is possible to provide an optical integrating pickup having a high light utilization efficiency in comparison with the general optical information recording/reproducing apparatus.

The principle of light detection using the optical integration detecting element 126 will next be described with reference to FIG. 7. Light wave-guided into the optical waveguide layer 129 is divided into two lights on waveguide convergent mirror faces 40a and 40b formed by removing the optical waveguide layer 129 and the gap adjusting layer 30 from the optical integration detecting element. Thereafter, the two divided lights are reflected on these waveguide convergent mirror faces 40a and 40b. One of the two divided/reflected lights is gathered toward the two divided photodetectors 34a and 34b as convergent waveguide light. The other divided/reflected light is gathered toward the other two divided photodetectors 34c and 34d as convergent waveguide light.

In this case, when operating states of the optical disk 39 and the objective lens 38 are respectively focusing states, convergent points P of the light reflected and converged on the waveguide convergent mirror faces 40a and 40b are respectively gathered between the photodectors 34a and 34b and between the photodetectors 34c and 34d. In contrast to this, when the operating states of the optical disk 39 and the objective lens 38 are states shifted from the above focusing states and the optical disk 39 and the objective lens 38 are separated from each other, the convergent points P are respectively shifted and moved toward the photodetectors 34a and 34d. When the operating states of the optical disk 39 and the objective lens 38 are states shifted from the above focusing states and the optical disk 39 and the objective lens 38 approach each other, the convergent points P are respectively shifted and moved toward the photodetectors 34b and 34c. Accordingly, it is possible to detect a focusing error signal by such a structure. A tracking error signal and a reproducing signal can be obtained by using optical signals detected by these four photodetectors 34a to 34d.

A concrete constructional example of the optical integration detecting element 126 will next be described. In the following description, with respect to the respective constructional elements of the optical integration detecting element 126, reference numerals np and nc respectively designate refractive indexes of the prism 32 and the adhesive layer 31. Reference numerals ng and nw respectively designate refractive indexes of the gap adjusting layer 30 and the optical waveguide layer 129. Further, reference numeral nb designates a refractive index of the buffer layer 128. In this case, these constructional elements are formed such that the following relation is satisfied.

$$n_p \approx n_c > n_w > n_g', n_b$$

The metallic layer 33 is formed in the shape of a stripe as shown in FIG. 7.

A concrete numerical example of these refractive indexes, etc. will next be described.

A wavelength of the laser beam is set to 790 nm.

The prism is made of glass having high refractive index np=1.7656.

The adhesive layer is made of polyimide having refractive index nc=1.70.

The gap adjusting layer is a sputtered $SiO_2$ film and the refractive index and thickness of this gap adjusting layer are set as follows.

$n_g' = 1.467$
$d = 0.52 \mu m$

The optical waveguide layer is a sputtered $SiO_2$ film and the refractive index and thickness of this optical waveguide layer are set as follows.

$n_w = 1.557$
$d = 1.5 \mu m$

The buffer layer is a $SiO_2$ film which is thermally grown on a Si substrate and the refractive index and thickness of this buffer layer are set as follows.

$n_b = 1.460$
$d = 1 \mu m$

The optical integration detecting element 126 is constructed by the above constructional elements. The metallic layer 33 is formed by an aluminum evaporation film. In the above case, the optical integration detecting element is arranged such that an incident angle of light incident onto the bottom face of the prism 32 is set to 61° to couple this light into the optical waveguide layer 129 in a coupling portion including the prism 32. In this case, the incident angle is an incident angle provided when this light is coupled into the optical waveguide layer 129 as a TE mode. When the beam diameter of parallel light provided by the coupling lens 36 is set to 4 mm by using the above optical integration detecting element 126, approximately 100 % of this parallel light reaches a surface of the optical disk 39 and about 70 % of the reflected light from the optical disk 39 can be wave-guided to the optical waveguide layer 129 through the prism 32. Accordingly, it is possible to further improve light utilization efficiency in comparison with the general optical information recording/reproducing apparatus.

Figure 8:
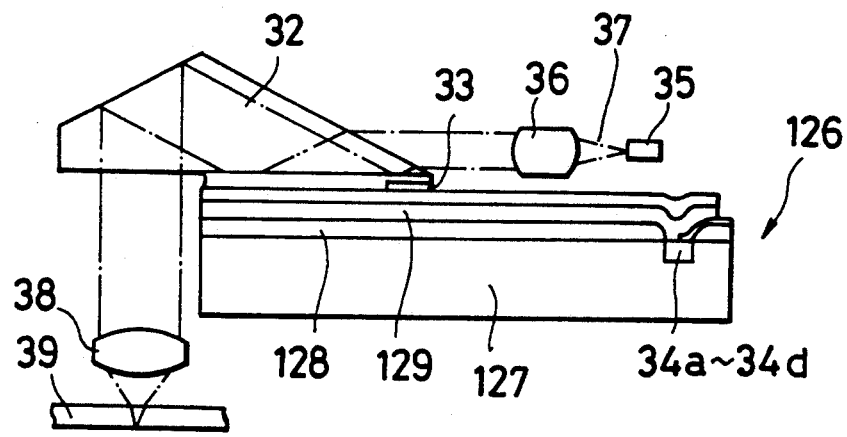
FIG. 8 is a side view showing a sixth structure of the present invention in an apparatus for recording and reproducing optical information in accordance with a third embodiment of the present invention.

FIG. 8 shows a sixth structure of the present invention in an apparatus for recording and reproducing optical information in accordance with a third embodiment of the present invention. In FIG. 8, the same constructional portions as those shown in FIG. 6 are designated by the same reference numerals and an explanation thereof is omitted in the following description.

In the third embodiment shown in FIG. 8, a light-emitting optical system 37 in constructed by a semiconductor laser 35 and a collimator lens 36. Light is emitted to a prism 32 of an optical integrated detecting element 126 from the light-emitting optical system 37. The light-emitting optical system 37 is arranged such that a transmitting direction of the light from the light-emitting optical system 37 to the prism 32 is parallel to a substrate face of the optical integrated detecting element 126. Accordingly, parallel light incident to the prism 32 is reflected on a bottom face thereof and is then reflected on another face of the prism 32 and is further emitted from another bottom face of the prism 32. Thus, the emitted light is transmitted in a direction approximately perpendicular to the substrate face of the optical integration detecting element 126 and is then guided onto a face of an optical disk 39. In this case, an inclination angle of a slanting face of the prism 32 is set to 31°.

As mentioned above, it is possible to make an optical pickup further compact by arranging the light-emitting optical system 37 in parallel with the substrate face of the optical integration detecting element 126.

Figure 9:
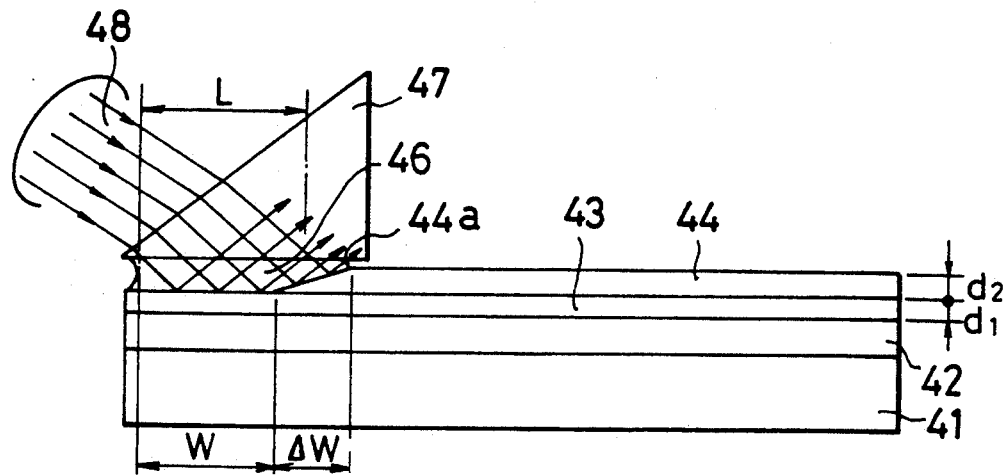
FIG. 9 is a side view showing seventh to tenth structures of the present invention with respect to a prism coupler in accordance with a fourth embodiment of the present invention.
Figure 10:
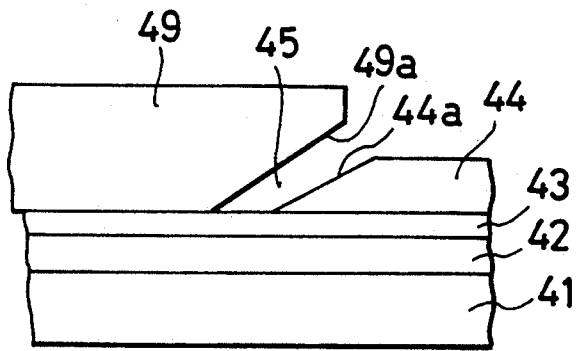
FIG. 10 is an enlarged side view of a tapered portion disposed in the seventh to tenth structures of the present invention with respect to the prism coupler in the fourth embodiment.

FIGS. 9 and 10 show seventh to tenth structures of the present invention with respect to a prism coupler in accordance with a fourth embodiment of the present invention. In FIGS. 9 and 10, an optical waveguide layer 42 is formed on a substrate 41. A first gap layer 43 is laminated on the optical waveguide layer 42 and has a refractive index lower than that of the optical waveguide layer 42. A second gap layer 44 is laminated on the first gap layer 43 and has a refractive index lower than that of the optical waveguide layer 42. The second gap layer 44 has a tapered portion 44a on an end face thereof and also has an opening portion 45 having a predetermined width W. The opening portion 45 of the second gap layer 44 is filled with an adhesive layer 46 having a refractive index higher than that of the optical waveguide layer 42. Thus, the adhesive layer 46 is adhered to the first gap layer 43. A dielectric prism 47 is adhesively fixed onto an upper portion of the adhesive layer 46 and is constructed by a prism composed of a dielectric substance having a refractive index higher than that of the optical waveguide layer 42. In the above prism coupler, an incident beam 48 is incident to the dielectric prism 47 and is then incident to both the opening portion 45 and the tapered portion 44a from a bottom face of the dielectric prism 47 through the adhesive layer 46. This incident beam is waveguide-coupled to the optical waveguide layer 42 through the first gap layer 43. In this case, the first gap layer 43 has an optimum thickness $d_1$ for coupling the incident beam 48 having a length L on the bottom face of the prism to the optical waveguide layer 42 most efficiently. It is necessary to set a thickness $d_2$ of the second gap layer 44 to a sufficiently large value such that no light coupled to the optical waveguide layer 42 is again radiated toward the dielectric prism 47.

As shown in FIG. 10, a shadow mask 49 is arranged in a region for the opening portion 45 to form the tapered portion 44a of the second gap layer 44 when the second gap layer 44 is formed by spattering. When the second gap layer 44 is formed in this arrangement state, the tapered portion 44a is formed in a position of the prism coupler corresponding to an end face portion 49a of the shadow mask 49. When the end face portion 49a of the shadow mask 49 is formed in a tapered shape, the tapered portion 44a of the second gap layer 44 can be formed in a tapered shape having a gentler inclination. In this embodiment, it is possible to form the tapered portion 44a having a taper ratio equal to or greater than 1 to 1000.

A concrete example of designing conditions in manufacture of the above prism coupler will next be described.

A wavelength of the incident laser beam is set to 0.6328 μm. The beam length L on the bottom face of the prism is set to 2 mm.

The substrate is made of glass having refractive index n=1.46.

The optical waveguide layer is made of SiON having refractive index n=1.55 and thickness d=1.5 μm and is formed by plasma CVD.

The first gap layer is made of $SiO_2$ having refractive index n=1.46 and thickness d=0.39 μm and is formed by spattering.

The second gap layer is made of $SiO_2$ having refractive index n=1.46 and thickness d=1.0 μm and is formed by spattering.

The dielectric prism is made of optical glass having high refractive index n=1.70.

The adhesive layer is formed by an optically transparent adhesive having a high refractive index. For example, the adhesive layer is formed by an adhesive of an ultraviolet (UV) light hardening type having refractive index n=1.63.

When the laser beam having 0.6328 μm in wavelength is incident to the prism coupler designed above, a high optical coupling efficiency equal to or greater than 80% can be obtained.

Figure 11:
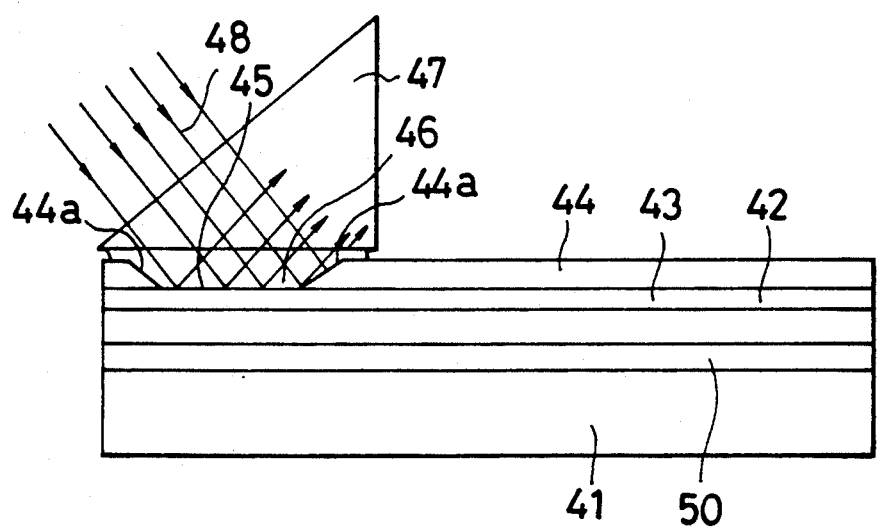
FIG. 11 is a side view showing seventh to tenth structures of the present invention with respect to a prism coupler in accordance with a fifth embodiment of the present invention.

FIG. 11 shows seventh to tenth structures of the present invention with respect to a prism coupler in accordance with a fifth embodiment of the present invention. In FIG. 11, the same constructional portions as those in the fourth embodiment shown in FIG. 9 are designated by the same reference numerals and an explanation thereof is omitted in the following description. In FIG. 11, a buffer layer 50 made of $SiO_2$ is formed by thermal oxidation on a silicon substrate 41. An optical waveguide layer 42, a first gap layer 43 and a second gap layer 44 are sequentially laminated on the buffer layer 50. Thereafter, an unillustrated photoresist is spin-coated to form an opening portion 45 for coupling an incident beam 48 to the optical waveguide layer 42 in the second gap layer 44. Thereafter, exposure and development are performed by using an unillustrated photomask corresponding to the opening portion 45. Then, the photoresist located in a position of the prism coupler corresponding to the opening portion 45 is removed from the prism coupler. Then, etching is performed by using hydrofluoric acid in a region of the second gap layer 44 corresponding to the opening portion 45. Thereafter, the photoresist is removed from the prism coupler so that the etched region is used as the opening portion 45. In this case, the opening portion 45 has a tapered shape on an end face thereof by an action of hydrofluoric acid used as an etching material. Thereafter, the opening portion 45 is filled with the adhesive layer 46 and the dielectric prism 47 is adhered onto the adhesive layer 46. Thus, the dielectric prism 47 can be fixed to regions of the first gap layer 43 and the second gap layer 44. Each of the first gap layer 43 and the second gap later 44 has a refractive index lower than that of the optical waveguide 42. Each of the dielectric prism 47 and the adhesive layer 46 has refractive index higher than that of the optical waveguide layer 42.

A concrete example of designing conditions in manufacture of the above prism coupler will next be described.

The substrate is made of silicon.

The buffer layer is formed by a thermal oxide layer made of $SiO_2$ and having refractive index n=1.46 and thickness d=1.0 μm.

The optical waveguide layer is made of SiON having refractive index n=1.55 and thickness d=1.5 μm and is formed by plasma CVD.

The first gap layer is made of $SiO_2$ having refractive index n=1.46 and thickness d=0.39 μm and is formed by spatting.

The second gap layer is made of SiON having refractive index n=1.47 and thickness d=1.0 μm and is formed by plasma CVD.

The dielectric prism is made of optical glass having high refractive index n=1.70.

The adhesive layer is formed by an adhesive of an ultraviolet light hardening type having high refractive index n=1.63.

In this case, an etching rate of the second gap layer with respect to hydrofluoric acid is about seven times that of the first gap layer with respect to hydrofluoric acid. Accordingly, only the second gap layer can be removed from the opening portion by controlling an etching time. A tapered portion having a taper ratio of about 1 to 100 can be formed by such an etching operation on an end face of the second gap layer.

As mentioned above, a first structure of the present invention resides in an apparatus for recording and reproducing optical information in which light emitted from a laser beam source is changed to a parallel light beam by a collimator lens and is converged and irradiated by an objective lens onto a surface of an optical information recording medium to record the optical information onto the optical information recording medium; the optical information recording/reproducing apparatus including an optical integration detecting element arranged on an optical path of the emitted light from the laser beam source to the optical information recording medium, the optical integration detecting element comprising a substrate; an optical waveguide layer formed on the substrate; a photodetector connected to the optical waveguide layer; a first gap layer formed on the optical waveguide layer and having a refractive index lower than that of the optical waveguide layer; a second gap layer formed on the first gap layer and having an opening portion and a refractive index lower than that of the optical waveguide layer; an adhesive layer having a refractive index higher than that of the optical waveguide layer and adhered to the first gap layer such that the opening portion of the second gap layer is filled with the adhesive layer; and a prism adhesively fixed to an upper portion of the adhesive layer and constructed by a dielectric substance having a refractive index higher than that of the optical waveguide layer.

In the first structure of the present invention, decoupling provided by the prism of the optical integrated detecting element is used on an optical path of the emitted light from the laser beam source to the optical information recording medium. The second gap layer is arranged on an optical path of the reflected light from the optical information recording medium and is located on a bottom face of the prism to prevent the decoupling. Accordingly, approximately 100% of light transmitted through a coupling lens reaches the optical information recording medium. Further, approximately 100% of the reflected light from the optical information recording medium reaches the prism. Accordingly, a large quantity of this light reaching the prism can be received by the photodetector formed in the optical integrated detecting element. Accordingly, a high light utilization efficiency can be obtained in comparison with the general optical information recording/reproducing apparatus.

In accordance with a second structure of the present invention, an end face portion of the second gap layer located in the opening portion thereof is formed in a tapered shape.

In the second structure of the present invention, it is possible to prevent scattering of light incident to the second gap layer so that the quantity of light detected by the photodetector can be further increased.

In accordance with a third structure of the present invention, the tapered end face portion of the second gap layer is formed by forming the second gap layer as a film in a state in which a shadow mask is arranged in the second gap layer.

In the third structure of the present invention, it is possible to form the second gap layer having a taper ratio equal to or greater that 1 to 1000 so that a position of the light incident to the second gap layer is easily adjusted.

In accordance with a fourth structure of the present invention, the adhesive layer is formed by a visible light cured adhesive or an UV light cured adhesive.

In the fourth structure of the present invention, after the opening portion of the second gap layer is filled with the adhesive, visible light or ultraviolet light is irradiated onto the adhesive in a state in which the prism comes in press-contact with the adhesive. Thus, the adhesive is hardened and the prism can be easily fixed to the adhesive layer, thereby increasing yield at a manufacturing time of the prism.

A fifth structure of the present invention resides in an apparatus for recording and reproducing optical information, comprising a laser beam source; a collimator lens for changing light emitted from the laser beam source to a parallel light beam; and an optical integration detecting element arranged on an optical path of the parallel light beam provided by the coupling lens; the optical integration detecting element including an optical waveguide layer formed on a surface of a substrate; a photodetector connected to the optical waveguide layer; a gap adjusting layer formed on a surface of the optical waveguide layer and having a refractive index lower than that of the optical waveguide layer; an adhesive layer formed on a surface of the gap adjusting layer and having a refractive index higher than that of the optical waveguide layer; a metallic layer disposed in a portion of the adhesive layer; and a prism formed of a surface of the adhesive layer and having a refractive index higher than that of the optical waveguide layer; the optical information recording/reproducing apparatus further comprising an objective lens arranged on an optical path on which the parallel light beam provided by the collimator lens with respect to the emitted light from the laser beam source is incident to the prism of the optical integrated detecting element and is coupled in and out the optical waveguide layer and is again emitted from the prism; and an optical information recording medium arranged on an optical path of light converged by the objective lens; the optical information recording/reproducing apparatus being set such that light reflected from the optical information recording medium is incident to the prism of the optical integrated detecting element and is coupled and propagated in the optical waveguide layer toward the photodetector.

In the fifth structure of the present invention, decoupling provided by the prism of the optical integrated detecting element is used on an optical path of the emitted light from the laser beam source to the optical information recording medium. The metallic layer is arranged on an optical path of the reflected light from the optical information recording medium and is located on a bottom face of the prism to prevent the decoupling. Accordingly, approximately 100% of the light transmitted through the collimator lens reaches the optical information recording medium. Further, approximately 100% of the reflected light from the optical information recording medium reaches the prism. Accordingly, a large quantity of this light incident to the prism can be received by the photodetector formed in the optical integrated detecting element. Accordingly, a high light utilization efficiency can be obtained in comparison with the general optical information recording/reproducing apparatus.

In accordance with a sixth structure of the present invention, a light-emitting optical system is constructed by the laser beam source and the coupling lens and is arranged such that a transmitting direction of light from the light-emitting optical system to the prism of the optical integration detecting element is parallel to the substrate surface of the optical integration detecting element, and the light-emitting optical system is set such that the light incident to the prism from the light-emitting optical system is coupled in the optical waveguide layer, is coupled out the optical wave-guide layer and is again reflected on one slanting face of the prism toward the optical information recording medium.

In the sixth structure of the present invention, the light-emitting optical system is arranged such that this light-emitting optical system is parallel to a substrate face of the optical integrated detecting element. Accordingly, an optical pickup system can be arranged in proximity to the optical integrated detecting element so that the optical information recording/reproducing apparatus can be made compact.

A seventh structure of the present invention resides in a prism coupler comprising a substrate; an optical waveguide layer formed on the substrate; a first gap layer formed on the optical waveguide layer and having a refractive index lower than that of the optical waveguide layer; a second gap layer formed on the first gap layer and having a refractive index lower than that of the optical waveguide layer; the second gap layer having a tapered portion on an end face thereof and an opening portion having a predetermined width; an adhesive layer having a refractive index higher than that of the optical waveguide layer and adhered to the first gap layer such that the opening portion of the second gap layer is filled with the adhesive layer; and a prism adhesively fixed to an upper portion of the adhesive layer and constructed by a dielectric substance having a refractive index higher than that of the optical waveguide layer.

In the seventh structure of the present invention, optical coupling efficiency with respect to an optical waveguide is mainly optimized by a thickness of the first gap layer. Accordingly, an optical coupling operation can be performed without any influence of inclination of the tapered portion as in the general prism coupler. Further, the optical coupling operation can be efficiently performed by increasing a size of the opening portion with respect to a large light beam having a radius equal to or greater than several millimeters divided by ten.

In accordance with an eighth structure of the present invention, the prism coupler is set such that a light beam is incident to both the opening portion and the tapered portion of the second gap layer.

In the eighth structure of the present invention, it is sufficient to make a portion of the light beam incident to the tapered portion of the second gap layer so that a position of the incident light beam is easily adjusted in comparison with the general prism coupler.

In accordance with a ninth structure of the present invention, the tapered portion of the second gap layer is formed by forming the second gap layer as a film in a state in which a shadow mask is arranged in the second gap layer.

In the ninth structure of the present invention, it is possible to form the second gap layer having a taper ratio equal to or greater than 1 to 1000 so that the position of the incident light beam is easily adjusted.

In accordance with a tenth structure of the present invention, the adhesive layer is formed by an adhesive of an optical hardening type or an adhesive of an ultraviolet hardening type.

In the tenth structure of the present invention, after the opening portion of the second gap layer is filled with the adhesive, visible light or ultraviolet light is irradiated onto the adhesive in a state in which the prism comes in press-contact with the adhesive. Thus, the adhesive is hardened and the prism can be easily fixed to the adhesive layer, thereby increasing yield at a manufacturing time of the prism.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical information recording/reproducing apparatus, comprising:
   a laser beam source;
   a collimator lens for changing light emitted from the laser beam source to a parallel light beam; and
   an optical integrated detecting element arranged on an optical path of the parallel light beam provided by the collimator lens;
   said optical integrated detecting element including:
   an optical waveguide layer formed on a surface of a substrate;
   a photodetector connected to the optical waveguide layer;
   a gap adjusting layer formed on a surface of said optical waveguide layer and having a refractive index lower than that of the optical waveguide layer;
   an adhesive layer formed on a surface of the gap adjusting layer and having a refractive index higher than that of said optical waveguide layer;
   a metallic layer disposed in a portion of the adhesive layer; and
   a prism formed on a surface of said adhesive layer and having a refractive index higher than that of said optical waveguide layer;
   said optical information recording/reproducing apparatus further comprising:
   an objective lens arranged on an optical path on which the parallel light beam provided by said collimator lens with respect to the emitted light from said laser beam source is incident to said prism of said optical integrated detecting element and is coupled in said optical waveguide layer and is again emitted from said prism; and
   an optical information recording medium arranged on an optical path of light converged by the objective lens;
   said optical information recording/reproducing apparatus being set such that light reflected from the optical information recording medium is incident to said prism of said optical integrated detecting element and propagates in said optical waveguide layer toward said photo detector, wherein a light-emitting optical system is constructed by the laser beam source and the collimator lens and is arranged such that a transmitting direction of light from the light-emitting optical system to the prism of the optical integrated detecting element is parallel to the substrate surface of said optical integrated detecting element, and the light-emitting optical system is set such that the light incident to said prism from the light-emitting optical system is coupled in and out the optical waveguide layer and is again reflected on one slanting face of said prism toward the optical information recording medium.

* * * * *